United States Patent
Buoni et al.

(10) Patent No.: US 6,375,776 B1
(45) Date of Patent: Apr. 23, 2002

(54) METHOD FOR FORMING MULTI-LAYER LAMINATES WITH MICROSTRUCTURES

(75) Inventors: Drew J. Buoni, Chicago, IL (US); Alan R. Kaufman, Hammond, IN (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/489,789

(22) Filed: Jan. 24, 2000

(51) Int. Cl.[7] .................. B32B 31/20; B32B 31/22; B32B 35/00
(52) U.S. Cl. .................. 156/209; 156/247; 156/289; 156/311; 156/324; 156/498; 156/543; 156/555
(58) Field of Search .................. 156/209, 219, 156/220, 247, 249, 289, 311, 324, 498, 537, 543, 553, 555

(56) References Cited

U.S. PATENT DOCUMENTS

| | | |
|---|---|---|
| 1,906,655 A | 5/1933 | Stimson |
| 3,332,327 A | 7/1967 | Heenan |
| 3,684,348 A | 8/1972 | Rowland |
| 3,689,346 A | 9/1972 | Rowland |
| 3,810,804 A | 5/1974 | Rowland |
| 3,811,983 A | 5/1974 | Rowland |
| 3,935,359 A | 1/1976 | Rowland |
| 4,091,137 A * | 5/1978 | Miller |
| 4,460,449 A | 7/1984 | Montalbano |
| 4,486,363 A * | 12/1984 | Pricone et al. |
| 4,601,861 A | 7/1986 | Pricone et al. |
| 5,310,436 A * | 5/1994 | Pricone et al. ............... 156/209 |
| 5,450,235 A | 9/1995 | Smith et al. |
| 5,503,705 A * | 4/1996 | Rohleder et al. ....... 156/209 X |
| 5,614,286 A | 3/1997 | Bacon, Jr. et al. |
| 5,632,946 A | 5/1997 | Bacon, Jr. et al. |
| 5,642,222 A | 6/1997 | Phillips |
| 5,691,846 A | 11/1997 | Benson, Jr. et al. |
| 5,763,049 A | 6/1998 | Frey et al. |
| 5,786,066 A | 7/1998 | Martin et al. |
| 5,805,339 A | 9/1998 | Martin et al. |
| 5,945,042 A | 8/1999 | Mimura et al. |
| 6,200,399 B1 | 3/2001 | Thielman |

* cited by examiner

Primary Examiner—Curtis Mayes
(74) Attorney, Agent, or Firm—Jones, Day, Reavis & Pogue

(57) ABSTRACT

A method of continuously forming a multi-layer laminate of thermoplastic polymeric films wherein one surface thereof has a precision pattern of embossed elements thereon and wherein the thermoplastic polymeric films can be dissimilar. A generally cylindrical seamless metal embossing tool with an outer surface having the reverse of the pattern to be formed on the surface of the sheeting is used. The laminate is formed by continuously feeding onto a heated embossing tool a superimposed first resinous film and a first carrier film wherein the first resinous film is pressed against the embossing tool and is heated above its glass transition temperature thereby becoming embossed with the pattern, while the first carrier film remains at a temperature below its glass transition temperature. The first carrier film is then removed, and a second resinous film and second carrier film are superimposed on the unembossed surface of the first resinous film and are heated such that the two resinous films become bonded together. The resulting laminate is then cooled and is stripped from the embossing tool. If the laminate is to be used for retroreflective sheeting, then, because the second resinous film is applied after the embossing step is complete, a smooth interface can be formed between the two resinous films. This results in a sheeting of exceptional retroreflective capability, even if the first and second resinous films are dissimilar thermoplastic materials.

47 Claims, 2 Drawing Sheets

METHOD FOR FORMING MULTI-LAYER LAMINATES WITH MICROSTRUCTURES

BACKGROUND OF THE INVENTION

1. Field of the Invention

The present invention relates generally to construction of multi-layer thermoplastic laminates having microstructures on one surface thereof and, more particularly, to multi-layer thermoplastic laminates of dissimilar polymeric films having microstructures on one surface thereof suitable, for example, for use as retroreflective sheeting.

2. Description of the Related Art

Thermoplastic sheeting products having a plurality of microstructures on one surface thereof have many commercial applications. Different types of microstructures can be provided on the sheeting depending on the purpose of the ultimate product. For example, it is known to provide on one surface of a thermoplastic film a plurality of microprismatic type channels in a pre-determined pattern. The channels can contain a deposit of a suitable chemical composition, for example, that changes color in the presence of a bodily fluid drawn into the microprismatic type channels by capillary action. Such products can be used in medical diagnostic devices, such as home pregnancy test kits. Another example of a commercial application for thermoplastic films having microprismatic structures is in fuel cells in accordance with well-known electro-chemical technology.

Another commercially significant application of thermoplastic films having microstructures on one surface is for use as retroreflective sheeting for highway signs and the like. In this type of application, the microstructures on one surface of the film are cube-corner retroreflective elements. The microstructures are in the form of an array of several "cube" elements each consisting of three essential mutually perpendicular faces which serve to receive incident light and retroreflect the light through 180° approximately parallel to its incident path and back to its source. The term "cube-corner" has long been recognized in the art to refer to essentially any structure of three mutually perpendicular faces without regard to the size or shape of each face or the optical axis of the element so provided. An early example of a macro-sized cube-corner type reflector is disclosed in Stimsonite, U.S. Pat. No. 1,906,655, issued May 2, 1933. Another example of a macro-sized cube-corner type reflector is in Heenan, U.S. Pat. No. 3,332,327 issued Jul. 25, 1967, which teaches a pavement marker construction.

Unlike a typical pavement marker construction, in which the cube corner elements may be relatively large in size, in reflective sheeting of the microprismatic type the cube-corner elements are reduced in size to be useable on a relatively thin film substrate. Microprismatic retroreflective sheeting is particularly useful in the construction of highway signage, for example, in which an aluminum sign blank is covered with a layer of light reflective sheeting bearing suitable indicia for informing drivers of a particular highway condition. Microprismatic retroreflective sheeting has also found applications in clothing and for vehicle graphics.

Methods to form thin film materials with microprismatic retroreflective elements on one surface thereof include embossing and casting. In many instances, the sheeting comprises a transparent polymethyl methacrylate (i.e. acrylic) substrate, or film, although various other forms of thermoplastic material may be used such as polycarbonate, polyvinyl chloride, polyolefin or polyurethane, for example.

An example of a highly efficient method and apparatus for continuous embossing of a resinous film with cube-corner retroreflective elements is disclosed in Pricone et al., U.S. Pat. No. 4,601,861, the disclosure of which is incorporated herein by reference in its entirety. In this process, a continuous web of transparent film is fed through an embossing machine along with a carrier film in which the transparent film is heated above its glass transition temperature and compressed against an embossing tool such that resinous film material flows into the pattern of the tool. The film laminate is then cooled, and stripped from the tool. The tool may be constructed by a process of the type disclosed in Montalbano, U.S. Pat. No. 4,460,449, the disclosure of which is incorporated herein by reference in its entirety. The tool of this patent is capable of creating very small, accurately formed microcube-corner elements on the order of several thousand per square inch of film. The '861 patent discloses that a second layer of thermoplastic material, such as a material containing UV inhibitors, can be simultaneously run through the embossing equipment with the first transparent film and the carrier, either by use of an additional feed roller or by prelaminating to the first transparent film. The '861 patent gives as an example a first transparent film of a rubber modified polymethyl methacrylate, and an additional layer of an acrylic material having significant UV inhibitors.

The above-described process has proved to be quite commercially successful in producing microprismatic sheeting having considerable retroreflective brilliance, particularly when used with single layer polymer films, or multi-layer films in which the polymeric materials have similar physical properties and substantially equivalent refractive indexes.

It also would be desirable to have a process for producing embossed multi-layer film laminates comprised of dissimilar polymeric film materials, that is, film materials having different physical properties and/or refractive indexes that are not substantially equivalent. Many modern highway signage applications now require extended outdoor durability of up to 12 years. The polymers selected to manufacture micro-prismatic retroreflective sheeting must be able to withstand extended sun light exposure and other harsh environmental conditions. Unfortunately, many polymers which have desirable properties for retroreflective microprismatic sheeting are not very weatherable. For example, polycarbonate is a desirable polymer to create cube corner microprisms because it has a refractive index of approximately 1.58. Those familiar with the art of optics and retroreflective structures will realize that such a high refractive index is desirable because it can yield retroreflective performance at wide angles of incident light. However, polycarbonate is an inherently poor weathering polymer. Within one year of outdoor exposure, it will yellow, crack and become hazy. While the use of ultra-violet absorbers with the polycarbonate film can extend its exterior performance, to obtain adequate durability for an outdoor highway signage application, an ultra-violet light screening layer or cap-layer must be placed on top of the polycarbonate. In order to provide adequate protection, the cap-layer film itself should be a polymer with exceptional durability properties such as polymethyl methacrylate or copolymers thereof. Accordingly, one reason that multi-layered film structures of dissimilar polymeric films are desirable is so that an ultra-violet light screening layer or cap-layer can be utilized to enhance the durability of an otherwise unweatherable polymer.

Another reason it is desirable to have a multi-layer laminate structure is to create sheeting materials with enhanced retro-reflective performance that also have improved flexibility. Generally speaking, a film to be embossed with cube-corner retroreflective elements should be somewhat tough and rigid, such as acrylic or polycarbonate. This is so because in order for the finished product to maintain its reflective brilliance, the cube-corner elements must be relatively rigid to retain their geometric shapes. Virtually any slight distortion of the rigid cube wall angles affects retroreflectivity. However, rigid polymers in themselves are not considered advantageous when used alone in applications that require greater flexibility, such as clothing. Although sheeting of such rigid polymers is capable of being wound on a roll during and after manufacturing, it is not sufficiently flexible to allow it to be sharply bent or folded. If the sheeting is sharply bent, it will be subject to crazing, which degrades retroreflective performance. Conversely, if the retroreflective film is entirely comprised of a soft, flexible polymeric film such as plasticized polyvinyl chloride, after embossing the corner cube retroreflective elements will not fully retain their ideal geometric configuration. When subjected to tension or pressure, the microprisms will become distorted. Accordingly, it is known to construct multi-layer film laminates wherein a base layer of a relatively rigid polymer is provided with cube-corner retroreflective elements and that layer is bonded to a more flexible polymer layer, such as polyurethane or flexible polyvinyl chloride. The latter serves to add body to the retroreflective layer such that the resultant laminate is more suitable for use in applications requiring flexibility. Such structures are disclosed, for example, in prior art U.S. Pat. Nos. 3,684,348; 3,689,346; 3,810,804; 3,811,983; and 3,935,359, of which U.S. Pat. Nos. 3,684,348 and 3,689,346 describe a lack of success in the manufacture of cube corner formations by embossing. U.S. Pat. No. 5,450,235 also discloses multi-layer cube corner sheets made by a casting technique.

A difficulty that has been encountered in producing multi-layer embossed retroreflective sheeting is that if the polymer layers have different refractive indexes, a hazy appearance may result during embossing which causes loss in retroreflectivity values. Applicants' assignee has found that essentially this phenomenon results when the interface between polymer layers of differing refractive indexes is not optically smooth; this causes light to be refracted in undesirable directions across the interface. Embossing the retroreflective elements in the base film layer of a multi-layer structure can cause the interface between the layers to develop a rough or random geometry, resulting in a non-optically smooth interface. The extent of this effect may depend on the thickness of the base film and the depth of the micro prismatic pattern embossed therein.

A second problem concerns heat degradation of one of the polymer films. If two polymers with significantly different glass-transition temperatures are combined in a multi-layer structure, the elevated temperatures required to emboss the base layer may initiate heat degradation of the top layer. This is particularly true when a flexible polymer top layer and a rigid polymer base layer are embossed together. For example, if flexible polyvinyl chloride is laminated over polycarbonate, the higher temperatures required to emboss retroreflective elements in the polycarbonate base layer will begin heat degradation of the polyvinyl chloride top layer.

Accordingly, it is desirable to provide a novel method for forming multi-layer embossed microprismatic sheeting where the layers are comprised of dissimilar polymeric materials, that is, polymeric materials that have different physical properties and/or refractive indexes that are not substantially equivalent. It is further desirable to provide such sheeting wherein the microprismatic structures are cube corner retroreflective elements and wherein the interface between the dissimilar polymeric materials is smooth and not random such that light will not be refracted in undesirable directions across the interface even if the refractive indexes of the polymeric materials are not substantially equivalent. Still further it is desirable to provide a method to produce such sheeting wherein thermal degradation of one of the polymeric films will not be induced by the heat used to emboss another polymeric film.

SUMMARY OF THE INVENTION

The present invention improves over the prior art by providing a method of continuously forming a multi-layer laminate of thermoplastic polymeric films with one surface thereof having a precision pattern of microprismatic elements embossed thereon. Preferably, the polymeric films have different physical properties, so that polymeric materials can be selected to optimize the performance of the final embossed product. Generally, such polymeric films also will have indexes of refraction that are not substantially equivalent. The method is performed with the use of a generally cylindrical endless metal embossing tool with an outer surface which is formed with the reverse of the pattern to be formed on the surface of the sheeting. The laminate is formed by continuously feeding onto a heated embossing tool a superimposed first resinous film and a first carrier film wherein the first resinous film is pressed against the embossing tool and is heated above its glass transition temperature thereby becoming embossed with the pattern, while the first carrier film remains at a temperature below its glass transition temperature. The first carrier film is then removed from superimposed relation with respect to the first resinous film. Next, a second resinous film and second carrier film are superimposed on the unembossed surface of the first resinous film and are heated such that the two resinous films become bonded together. The resulting laminate is then cooled and is stripped from the embossing tool. If the first and second resinous films have refractive indexes that are not substantially equivalent, then preferably the surfaces of the first and second resinous films that are in contact with one another are each optically smooth. Thus, a smooth interface is formed between the two resinous films, resulting in an embossed multi-layer product having exceptional retroreflective capability when used as retroreflective sheeting. The first and second resinous films may be selected for other performance characteristics when the laminate is to be used in applications other than retroreflective sheeting.

BRIEF DESCRIPTION OF THE DRAWINGS

The foregoing and other novel features and advantages of the invention will be better understood upon a reading of the following detailed description taken in conjunction with the accompanying drawings, wherein.

DETAILED DESCRIPTION OF THE PREFERRED EMBODIMENTS

The invention will now be described with reference to retroreflective sheeting applications, although it will be appreciated that it is equally applicable to other applications wherein it is desired to form multi-layer embossed films which may be constructed of dissimilar polymeric layers.

As used in this patent, the term "optically smooth" refers to a surface or interface at which the behavior of an incoming ray of light is not substantially affected by physical irregularities in the surface or interface. For example, a matte surface is not optically smooth, while a glossy surface is optically smooth.

The term "substantially equivalent refractive indexes" as used in this patent means refractive indexes that are close enough to one another such that different layers of films with such refractive indexes can be used together in a retroreflective article with a non-optically smooth interface therebetween and while maintaining substantially the same levels of retroreflectivity that would be achieved with a single layer film.

Figure 1:
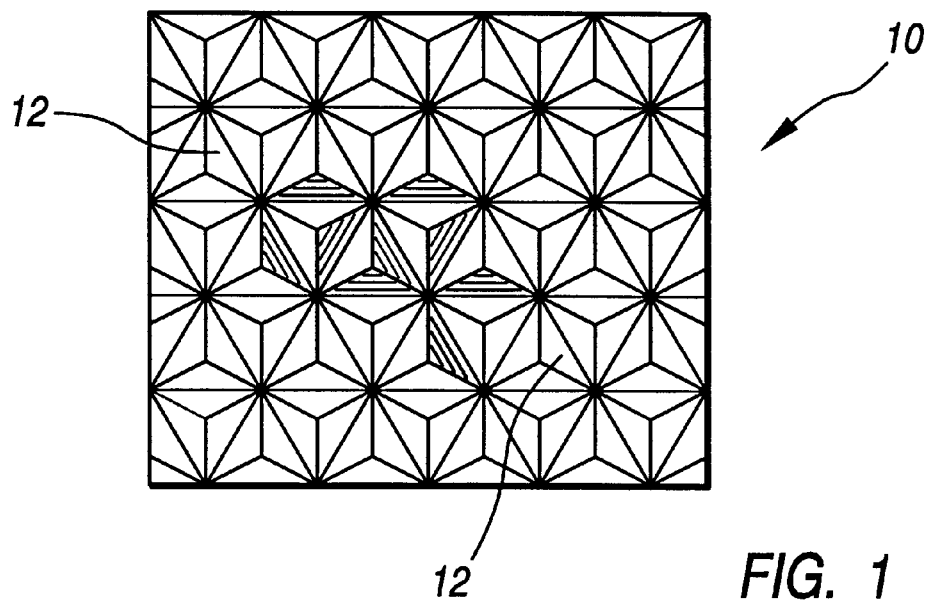
FIG. 1 is a plan view, greatly enlarged and somewhat fragmentary, of the embossed surface of one form of retroreflective film produced by the present invention.

Referring to the drawings, and initially to FIG. 1, a section of retroreflective film is shown in plan view and designated generally by the reference numeral 10. The film 10 is of transparent thermoplastic material having embossed on one surface thereof a repeating pattern of cube-corner type reflector elements 12. Film 10 initially had parallel front and back surfaces and was between 0.0015 to 0.008 inches thick, however, depending upon the desired properties of the retroreflective sheeting, other gauges may be used. The retroreflective pattern was formed with the aid of an embossing tool of a thin flexible metal belt of the type disclosed in U.S. Pat. No. 4,601,861, assigned to the common assignee herein and incorporated herein by reference in its entirety, and as will be discussed in detail hereinafter.

Figure 2:
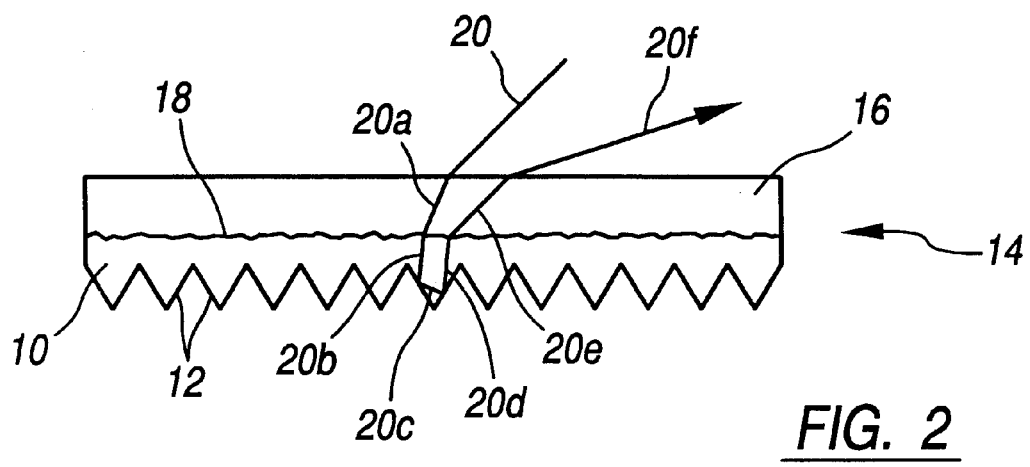
FIG. 2 is a side schematic view, greatly enlarged, of two layers of bonded film illustrating the results of a rough and not optically smooth interface between the two films.

FIG. 2 illustrates a multi-layer sheeting 14 comprising, for example, a lower layer of film 10 embossed with retroreflective elements 12 and shown as being bonded to an upper layer of a dissimilar film 16, where film 16 also has a refractive index not equivalent to that of film 10. Direct bonding of the embossed film 10 to film 16 as discussed above creates a rough or random non-optically smooth interface 18 between the two films. An incident ray of light 20 is refracted first at the top surface of film 16 into ray 20a. When ray 20a meets the non-optically smooth interface 18 between the two different polymer films 10 and 16, due to the rough interface between the two different polymer films, the incident light ray 20a is not refracted into ray 20b solely according to Snell's Law of Refraction. Ray 20b will be reflected at the surfaces of retroreflective element 12 as rays 20c and 20d, in accordance with known optical principles. Similarly, upon the return of ray 20d to interface 18 after retroreflection in the retroreflective element 12, light ray 20d is not refracted solely according to Snell's Law of Refraction into 20e. Hence, ray 20e is generally not parallel to 20a, and exiting ray 20f is generally not parallel to incident ray 20. Thus, low levels of retroreflection result, and sheeting 14 constructed by such a direct bonding technique may be unacceptable for many uses of retroreflective sheeting.

Individuals familiar with the art of microprismatic retroreflective films will recognize that if the two different polymer films 10 and 16 have substantially equivalent refractive indexes, the above described problems will not exist, even with a non-optically smooth interface, and high levels of retroreflection can be maintained.

Figure 3:
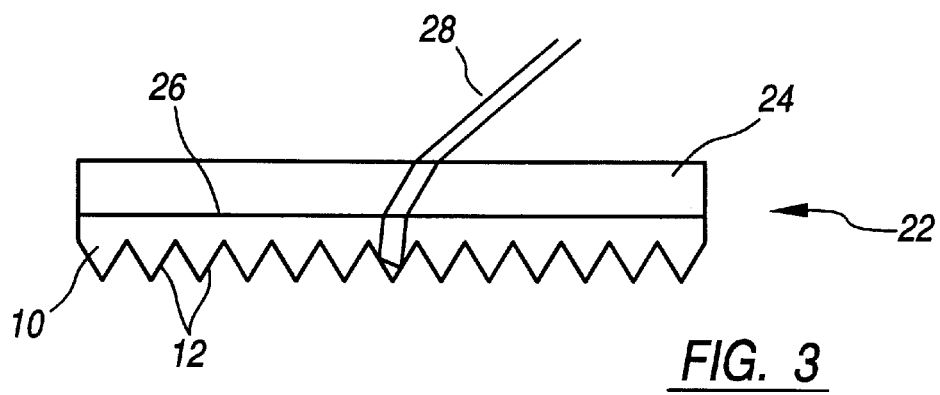
FIG. 3 is a side schematic view, greatly enlarged, of two layers of bonded film illustrating the results of an optically smooth interface between the two films.

By way of contrast, FIG. 3 illustrates sheeting 22 with film 10 being bonded to another dissimilar film 24 and with an optically smooth interface 26 therebetween. In this example of sheeting 22, incident light 28 is refracted at the interface 26 primarily in accordance with Snell's Law of Refraction, both as it enters interface 26 and as it leaves interface 26, such that light exiting sheeting 22 is reflected substantially parallel back to its source, resulting in good retroreflective performance, even if films 10 and 24 have refractive indexes that are not substantially equivalent.

Figure 4:
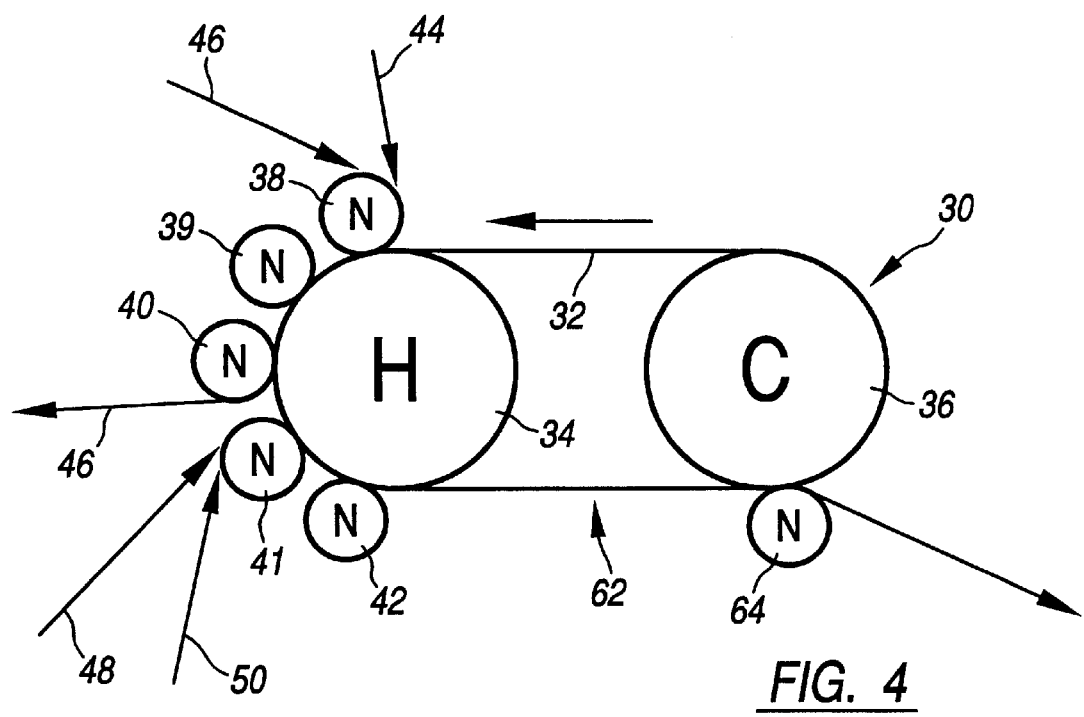
FIG. 4 is a side schematic view of an apparatus for constructing multi-layer sheeting in accordance with the present invention.

Turning now to FIG. 4, an embosser apparatus constructed according to the invention is designated generally by the reference numeral 30. This apparatus is very similar in design and configuration to the apparatus disclosed in the aforementioned U.S. Pat. No. 4,601,861. To this end, it comprises as a principal component, an endless, seamless metal belt or tool 32 which is rotatable about a heating roller 34 and cooling roller 36. The outer surface of the tool 32 is fabricated with a microprismatic pattern such as minute precision cube-corner elements, which are the reverse of the pattern embossed in the film 10. Spaced sequentially around the heating roller 34, and preferably through a range of about 180 degrees are a plurality of pressure rollers 38, 39, 40, 41 and 42. Each pressure roller is preferably formed from silicone rubber with a durometer hardness ranging from Shore A 60 to 90.

In accordance with the invention, multi-layer sheeting is constructed with the aid of apparatus 30 by simultaneously feeding both a lower layer polymer film 44, such as film, described above, together with a specialized carrier film 46 into the embosser 30 between pressure roller 38 and the embossing tool 32. The region of the embosser 30 in which embossing tool 32 is in contact with heating roller 34 functions as a heating station. The temperature of the heating roller 34 is set such that the tool 32 is raised to a temperature above the glass transition temperature of the film 44. When acrylic is used, the heating roller temperature can be about 425° F., although one skilled in the art will recognize that the optimum temperature of the heating roller will depend on environmental conditions and the particular features of the specific embossing machine used. Heating of the roller 34 can be accomplished such as by circulating hot oil axially through the roller 34, or by electrically heating roller 34. The film 44 and carrier 46 pass between pressure rollers 38, 39 and 40 and the tool 32 whereupon the optical pattern of the tool 32 is impressed into the film 44. As will be described hereinafter, the carrier film 46 is selected as to have a glass transition temperature higher than that of the film 44 and, therefore, remains unaffected by the tool 32 as it passes beneath the pressure rollers 38, 39 and 40.

After the embossed film 44 and carrier film 46 pass roller 40, in accordance with the invention the carrier film 46 is separated from superimposed relationship with film 44 and can be moved onto a wind-up roll (not shown). However, the film 44 continues to be adhered to the tool 32 and reaches pressure roller 41 at which point a superimposed top layer of polymer film 48 and a standard carrier film 50 are joined with the film 44 and together pass beneath the rollers 41 and 42 with the film 44. Because the tool 32 is still in contact with the heating roller 34 at this point, the two polymer films 44 and 48 become bonded together. Like carrier film 46, the carrier film 50 is selected to have a glass transition temperature which is higher than that of both film 44 and film 48. The multi-layer laminate next moves through a cooling station, which can be a generally planar region 62 where the laminate is cooled such as by a chilled fluid such as chilled air, and finally exits the embosser 30 at a stripper roller 64, which strips the laminate from the tool (such as disclosed in U.S. Pat. No. 4,601,861). Depending on the intended use of the microprismatic product, the microprisms can be metallized, or the sheeting can be provided with a backing layer that allows an air interface at some of the microprisms, in accordance with methods known to those skilled in the retroreflective sheeting art.

While lower layer polymer film 44 and top layer polymer film 48 have been illustrated in FIG. 4 for the sake of simplicity as each comprising a single film layer, the instant invention is not so limited. Films 44 and 48 can each comprise a plurality of films. For example, film 44 can comprise a plurality of layers of different polycarbonate films, which layers may have different additives such as colorants and may otherwise differ somewhat from one another. The various layers of film 44 can be pre-laminated together prior to being fed into apparatus 30, or the layers can be fed into apparatus 30 as separate webs and laminated together as they pass between the nip rollers 38, 39, 40 and heating roller 34. If the microprismatic product is to be used in an application involving optical performance, such as retroreflective sheeting, then each of the plurality of films that make up film 44 must have substantially equivalent refractive indexes. Otherwise, the rough interface between the plurality of films that will be created as the film is embossed with the microprismatic pattern will lead to a hazy appearance and a decrease in retroreflectivity. Similarly, film 48 can comprise a plurality of layers of, for example, different acrylic films, which can be either pre-laminated together, or fed into the apparatus 30 as separate webs and laminated together as they pass between the nip rollers 41, 42 and heating roller 34. Unlike film 44, since the microprisms are not being formed into film 48, a rough or random interface is not likely to be created between the plurality of films of film 48. Hence, good optical performance can be achieved, if desired, even if dissimilar polymeric films comprise film 48, provided that the interface between each film layer is optically smooth.

In the above-described process it will be understood that the carrier films 46 and 50 generally perform several functions. First, they serve to maintain the film 44 under pressure against the tool 32 while traveling around the heating roller 34. While traversing the distance between the heating roller 34 and cooling roller 36 film 50 assures conformity of the film 44 with the precision pattern of the tool 32 during the change in temperature gradient of the film 44 as it drops below its glass transition temperature. Second, the films 46 and 50 maintain the outer surfaces of films 44 and 48, respectively with a flat, optically smooth finish for optical transmission. Finally the films 46 and 50 act as carriers for the films 44 and 48 in their weak "molten" state and prevent the films 44 and 48 from otherwise adhering to the pressure rollers when heated to above their glass transition temperatures.

In accordance with the invention, the first carrier film 46 also performs additional important functions. Preferably, carrier film 46 has a polished surface on the side facing first resinous film 44 to create or maintain an optically smooth and flat surface on the film 44 as it is embossed by the tool 32. Second, because the first carrier film 46 is removed in the middle of the sheeting construction process, the second carrier film 50, can be added to the process at a later stage to limit the heat history on the additional resinous film 48. In their basic construction, carrier films such as of polyester (e.g. Mylar) or polyamide (e.g. Kapton), for example, cannot be removed from an embosser at elevated temperatures. In its "molten" form, the lower layer of embossed polymer film 44 tends to stick to such carrier films and the embossed structure is distorted or destroyed. To avoid these effects, a silicone-based release coating may be applied to the surface of carrier film 46. However, to avoid silicone transfer contamination, a non-reactive metal catalyzed polydimethylsiloxane-based release coating with low outgassable silane levels is preferred. Particular success has been found using as carrier films 46 and 50 a polyester film such as polyethylene naphthalate or polyethylene terephthalate. In one embodiment of the invention, the first web of polymer film used as first carrier film 46 can be directed by roller means to be re-applied to the sheeting structure as second carrier film 50, instead of being directed to a wind-up roll.

It can now be appreciated that the method of the present invention offers considerable advantages in producing multi-layer embossed microprismatic retroreflective sheeting having exceptional retroreflectivity performance, even when dissimilar polymeric materials are used. Tests were conducted on a structure consisting of 5 mil embossed polycarbonate with a 2.5 mil acrylic (PMMA) top layer. The particular polycarbonate used was Dow Calibre 302. The acrylic used was very similar to Elf Atochem Atoglas DR. First, the sheeting structure was manufactured according to the traditional embossing methods described in the aforementioned '861 patent, in which both films were fed into the embosser simultaneously. Next, the same embossed sheeting structure was manufactured using the process of the present invention as heretofore described, wherein the polycarbonate was fed into the apparatus and embossed, and the acrylic was then fed into the apparatus and laminated to the embossed polycarbonate. Retroreflectivity values of the two resulting laminates are compared as follows. The values represent an average of forty measurements at −4° entrance angle and 0.1° observation angle.

|  | $R_A$ (cd/lux/m$^2$) |
| --- | --- |
| Traditional Embossing Technique | 260 |
| Novel Embossing Process | 1510 |

It can also be appreciated that although the invention has been described in connection with two-layer sheeting structures, by the same techniques as above described three or more resinous layers can be combined into a multi-layer laminate structure. If desired, the same web of polymeric material can be used as the carrier layer for each resinous layer of the laminate.

While the invention has been described in connection with preferred embodiments thereof, it will be apparent to those skilled in the art that many changes and modifications may be made without departing from the true spirit and scope of the present invention. For example, in some versions of the invention, it may be desirable to remove the first carrier film, 46, after the final pressure roller 42, and only partially cool the embossed film 44. The top-layer film 48 and the second carrier 50 then can be added just prior to pressure roller 64. Such a set-up is desirable if the surface of embossed film 44 needs to be "quenched" prior to bonding of the top-layer film 48.

It also will be apparent that the invention is not limited to the construction of retroreflective sheeting. Rather, the invention has applicability to the construction of essentially any multi-layer embossed laminate having microstructures embossed on one surface thereof wherein the laminate may comprise layers of dissimilar polymeric materials. Accordingly, it is intended by the appended claims to cover all such changes and modifications as come within the spirit and scope of the invention.

What is claimed is:

1. A method of continuously forming a multi-layer laminate of thermoplastic sheeting with one surface thereof having a precision embossed pattern of microstructures thereon, the method being performed with the use of a generally cylindrical endless embossing tool having an inner surface and an outer surface, the outer surface having a precision pattern which is the reverse of the precision pattern to be formed on said one surface of said sheeting, and wherein the method includes the steps of:

a) continuously moving the endless embossing tool along a closed course through a heating station, where the embossing tool is heated through its inner surface to a predetermined temperature and then to a cooling station where the embossing tool is cooled below said predetermined temperature;

b) continuously feeding onto the embossing tool as it passes through a part of said heating station a superimposed first resinous film and first carrier film wherein said first resinous film has a glass transition temperature at least as low as said predetermined temperature and said first carrier film has a glass transition temperature higher than that of said first resinous film, said first resinous film having a first surface in direct contact with the outer precision patterned surface of said embossing tool, and a second surface in contact with a surface of said first carrier film;

c) continuously pressing said superimposed first resinous film and first carrier film against said embossing tool at at least one pressure point adjacent a first position at said heating station until said first surface of said first resinous film conforms to said pattern of said embossing tool;

d) continuously removing said first carrier film from superimposed relation with respect to said first resinous film after said first surface of the first resinous film is conformed to the pattern of said embossing tool;

e) continuously superimposing a second resinous film and second carrier film onto said second surface of said first resinous film with a surface of said second resinous film in contact with said second surface of said first resinous film, and pressing said first and second resinous films and second carrier film against said embossing tool at at least one pressure point adjacent a second position of said heating station until said first and second resinous films become bonded together to form a laminate;

f) continuously passing said embossing tool and laminate through said cooling station where the temperature of said embossing tool and laminate is lowered below said predetermined temperature; and g) continuously stripping said laminate from said embossing tool.

2. The method of claim 1 including the further steps of, prior to continuously passing said laminate through said cooling stations, removing said second carrier film from superimposed relation with respect to said second resinous film and subsequently superimposing one or more additional resinous films against said laminate at one or more additional pressure points of said heating station to thereby bond said one or more additional resinous films to said laminate.

3. The method of claim 1 wherein said course is arcuate through said heating station and at least three pressure points are provided thereof by spaced pressure rollers.

4. The method of claim 1 wherein said course is generally planar through said cooling station.

5. The method of claim 1 wherein the cooling at said cooling station is achieved by directing a chilled fluid against said laminate.

6. The method of claim 1 wherein said embossing tool is a thin flexible seamless metal belt and said heating station is a heated roller.

7. The method of claim 1 wherein said precision pattern comprises an array of retroreflective cube corner elements.

8. The method of claim 7 wherein the interface between said first resinous film and said second resinous film of said laminate is optically smooth.

9. The method of claim 1 wherein said first carrier film has a polished surface in contact with said first resinous film.

10. The method of claim 1 Wherein the interface between said first resinous film and said second resinous film of said laminate is optically smooth.

11. The method of claim 1 wherein said first carrier film is coated with a release agent on a side in contact with said first resinous film.

12. The method of claim 11 wherein said release agent is a silicone-based release coating.

13. The method of claim 1 wherein said first carrier film is a polyester.

14. The method of claim 13 wherein said polyester is selected from the group consisting of polyethylene naphthalate and polyethylene terephthalate.

15. The method according to claim 1 wherein the same web of polymeric film is used as said first carrier film and said second carrier film.

16. The method according to claim 1 including the step of quenching the surface of the first resinous film prior to bonding thereto of said second resinous film.

17. The method of claim 1 wherein said first resinous film comprises a plurality of films.

18. The method of claim 17 wherein said plurality of films have substantially equivalent refractive indexes.

19. The method of claim 17 wherein said plurality of films are laminated together to form said first resinous film prior to being fed onto the embossing tool.

20. The method of claim 17 wherein said plurality of films are fed in superimposed relationship onto said embossing tool to form said first resinous film.

21. The method of claim 1 wherein said second resinous film comprises a plurality of films.

22. The method of claim 21 wherein said plurality of films have substantially equivalent refractive indexes.

23. The method of claim 21 wherein said plurality of films have optically smooth interfaces therebetween.

24. The method of claim 21 wherein said plurality of films are laminated together to form said second resinous film prior to being fed onto the embossing tool.

25. The method of claim 21 wherein said plurality of films are fed in superimposed relationship onto said first resinous film to form said second resinous film.

26. Apparatus for forming a multi-layer laminate of thermoplastic sheeting with one surface thereof having a precision embossed pattern of microstructures thereon, comprising:

(a) embossing means including a continuous embossing tool having an inner surface and an outer surface, said outer surface having a precision embossing pattern thereon;

(b) means for continuously moving said embossing tool along a closed course;

(c) means for introducing superimposed first resinous film and first carrier film onto said embossing tool with a first surface of said first resinous film in direct contact with said embossing pattern;

(d) means for heating a portion of said embossing tool to raise the temperature of said portion of said embossing tool to a pre-determined temperature above the glass transition temperature of said first resinous film and below the glass transition temperature of said first carrier film while said portion of said embossing tool is in a first portion of its course to thereby emboss said pattern into said first resinous film;

(e) means for removing said first carrier film from superimposed relation with said first resinous film, said means comprising a wind-up roll for said first carrier film;

(f) means for introducing superimposed second resinous film and second carrier film onto said first resinous film after said first carrier film has been removed and while said first resinous film is at or above said predetermined temperature, with a surface of said second resinous film in direct contact with a second surface of said first resinous film to thereby bond together said first and second resinous films without heating said second carrier film to its glass transition temperature;

(g) means for cooling said bonded resinous films to thereby rigidify the embossing pattern of said first resinous film; and (h) means for stripping said bonded resinous films from said embossing tool after cooling.

27. Apparatus according to claim 26 including means for superimposing one or more additional resinous films against said bonded first and second resinous films and bonding said one or more additional films to said first and second films.

28. Apparatus according to claim 26 wherein said embossing tool is a thin seamless flexible metal belt.

29. Apparatus according to claim 26 wherein said heating means includes an internally heated roller.

30. Apparatus according to claim 29 wherein said roller is heated internally by circulating hot oil.

31. Apparatus according to claim 29 wherein said roller is heated electrically.

32. Apparatus according to claim 26 wherein said embossing pattern is in the form of an array of cube corner retroreflective elements.

33. Apparatus according to claim 26 including first pressure means for pressing said first resinous film and first carrier film against said embossing tool at said heating means.

34. Apparatus according to claim 33 wherein said first pressure means includes a plurality of rollers.

35. Apparatus according to claim 33 including second pressure means for pressing said first and second resinous films and second carrier film against said embossing tool at said heating means.

36. Apparatus according to claim 35 wherein said second pressure means includes a plurality of rollers.

37. Apparatus according to claim 26 wherein said course is generally planar through said cooling means.

38. Apparatus according to claim 26 wherein said cooling means includes means for directing a chilled fluid against said bonded resinous films and second carrier film.

39. Apparatus according to claim 26 wherein said first resinous film comprises a plurality of films, said apparatus including means for feeding said plurality of films in superimposed relationship onto said embossing tool to form said first resinous film.

40. Apparatus according to claim 26 wherein said second resinous film comprises a plurality of films, said apparatus including means for feeding said plurality of films in superimposed relationship onto said first resinous film to form said second resinous film.

41. A method of continuously forming a multi-layer laminate of thermoplastic sheeting with one surface thereof having a precision embossed pattern of microstructures thereon, the method being performed with the use of an embossing tool having an inner surface and an outer surface, the outer surface having a precision pattern which is the reverse of the precision pattern to be formed on said one surface of said sheeting, and wherein the method includes the steps of:

a) moving the embossing tool through a heating station, where the embossing tool is heated to a predetermined temperature;

b) feeding onto the embossing tool as it passes through a part of said heating station a superimposed first resinous film and first carrier film wherein said first resinous film has a glass transition temperature at least as low as said predetermined temperature and said first carrier film has a glass transition temperature higher than that of said first resinous film, said first resinous film having a first surface in direct contact with the outer precision patterned surface of said embossing tool, and a second surface in contact with a surface of said first carrier film;

c) pressing said superimposed first resinous film and first carrier film against said embossing tool at at least one pressure point adjacent a first position at said heating station until said first surface of said first resinous film conforms to said pattern of said embossing tool;

d) removing said first carrier film from superimposed relation with respect to said first resinous film after said first surface of the first resinous film is conformed to the pattern of said embossing tool;

e) superimposing a second resinous film and second carrier film onto said second surface of said first resinous film with a surface of said second resinous film in contact with said second surface of said first resinous film, and pressing said first and second resinous films and second carrier film against said embossing tool at at least one pressure point adjacent a second position of said heating station until said first and second resinous films become bonded together to form a laminate;

f) stripping said laminate from said embossing tool.

42. The method of claim 41 wherein said embossing tool is an endless embossing tool.

43. The method of claim 42 wherein said embossing tool is a generally cylindrical embossing tool.

44. The method of claim 41 wherein said embossing tool is moved continuously along a closed course.

45. The method of claim 41 wherein the embossing tool is heated through its entire surface.

46. The method of claim 44 wherein said closed course includes a cooling station.

47. The method of claim 46 wherein prior to stripping said laminate from said embossing tool, said embossing tool and laminate are passed through said cooling station where the temperature of said laminate is lowered below said predetermined temperature.

* * * * *